Dec. 4, 1951 R. M. MAGNUSON 2,577,086

ONION HALVING DEVICE

Filed April 7, 1945 8 Sheets-Sheet 1

INVENTOR.
ROY M. MAGNUSON.
BY
Boyken, Mohler & Beckley
ATTORNEYS.

INVENTOR.
ROY M. MAGNUSON
BY
Boyken, Mohler & Beckley
ATTORNEYS.

Dec. 4, 1951 R. M. MAGNUSON 2,577,086

ONION HALVING DEVICE

Filed April 7, 1945 8 Sheets-Sheet 3

INVENTOR.
ROY M. MAGNUSON.
BY
Boyken, Mohler & Beckley
ATTORNEYS.

Dec. 4, 1951 R. M. MAGNUSON 2,577,086

ONION HALVING DEVICE

Filed April 7, 1945 8 Sheets-Sheet 4

INVENTOR.
ROY M. MAGNUSON.
BY
Boyken, Mohler & Beckley
ATTORNEYS.

Dec. 4, 1951 R. M. MAGNUSON 2,577,086

ONION HALVING DEVICE

Filed April 7, 1945 8 Sheets-Sheet 5

INVENTOR.
ROY M. MAGNUSON

BY

Boykin, Mohler & Beckley

ATTORNEYS.

Dec. 4, 1951 R. M. MAGNUSON 2,577,086

ONION HALVING DEVICE

Filed April 7, 1945 8 Sheets-Sheet 6

INVENTOR.
ROY M. MAGNUSON
BY
Boyken, Mohler & Beckley
ATTORNEYS.

Dec. 4, 1951 R. M. MAGNUSON 2,577,086

ONION HALVING DEVICE

Filed April 7, 1945 8 Sheets-Sheet 7

INVENTOR.
ROY M. MAGNUSON.
BY
Boykin, Mohler & Beckley
ATTORNEYS.

Dec. 4, 1951

R. M. MAGNUSON 2,577,086

ONION HALVING DEVICE

Filed April 7, 1945

8 Sheets-Sheet 8

INVENTOR.
ROY M. MAGNUSON
BY
Boyken, Mohler & Beckley
ATTORNEYS.

Patented Dec. 4, 1951 2,577,086

UNITED STATES PATENT OFFICE 2,577,086

ONION HALVING DEVICE

Roy M. Magnuson, Campbell, Calif., assignor to Basic Vegetable Products Co., Vacaville, Calif., a copartnership Application April 7, 1945, Serial No. 587,124

5 Claims. (Cl. 146—73)

This invention relates specifically to an apparatus and method for handling and cutting onions, and has for one of its objects an improved method of slicing onions for dehydration or treatment of the slices and separation of the root and stem ends of the onions.

Another object of the invention is apparatus for bisecting substantially at right angles to their respective root-stem axes for further treatment of the bisected onions, such as slicing thereof, and separation of various portions of the onions.

Another object of the invention is apparatus adapted to automatically slice onions and to automatically reject or discard the root-stem ends so the latter will not be mixed with the slices.

Other objects of the invention are improved means and an improved method for slicing onions.

A still further object of the invention is the provision of improved means for slicing onions and for uniformly distributing the slices on conveying means for dehydration of the slices.

Other objects and advantages will appear in the drawings and in the description.

In dehydrating onions they are first cut into slices. The root and stem ends, being undesirable in the finished product, are sorted out at some point in the handling.

Before the slicing operation it is desirable that the onions be graded or sorted for both size and shape, and the present invention provides for handling the onions automatically through the various steps commencing with the steps of sorting or grading them for size and shape, and ending with the steps of slicing the sorted onions and distributing the slices substantially uniformly on the trays that pass to the dehydrator, and which slicing step includes the step of automatically separating the root and stem ends of the onions from the slices.

Between the first and final steps above noted, the onions are handled automatically by apparatus hereinafter disclosed so as to insure fast and accurate slicing. In certain instances where the onions may be field sorted previously to being cut, that part of the present system that is adapted to automatically handle the sorted onions may be used without loss in efficiency in slicing the onions and in separating the root and stem ends.

Heretofore the handling and treating of onions for dehydration thereof has been a relatively slow, inefficient and costly procedure. Nor have the results been entirely satisfactory. The shape of onions and variations in shape and size due to the different kinds of onions being handled, both as to species and locale have been contributing factors in the lack of a method and apparatus for such handling and treating of the onions.

With the present invention, the obstacles heretofore encountered have been overcome. The initial concept of a solution to the problems was in a method of handling the onions, taking into consideration the peculiarities of onions and the desired result. The apparatus for so handling the onions or for practicing the steps of the method followed the original concept.

It is to be understood that the drawings and description are illustrative of the preferred apparatus and method for accomplishing the desired results and are not to be considered restrictive of the invention. Also, while the description and claims specifically refer to onions, this is not to be interpreted as necessarily restricting the invention to onions, inasmuch as there may be other vegetables and also fruit that could be handled by the apparatus in the same manner as onions.

In the drawings, Fig. 1 is a diagrammatic plan view of a system embodying the invention.

Figures 7, 8, 8A:
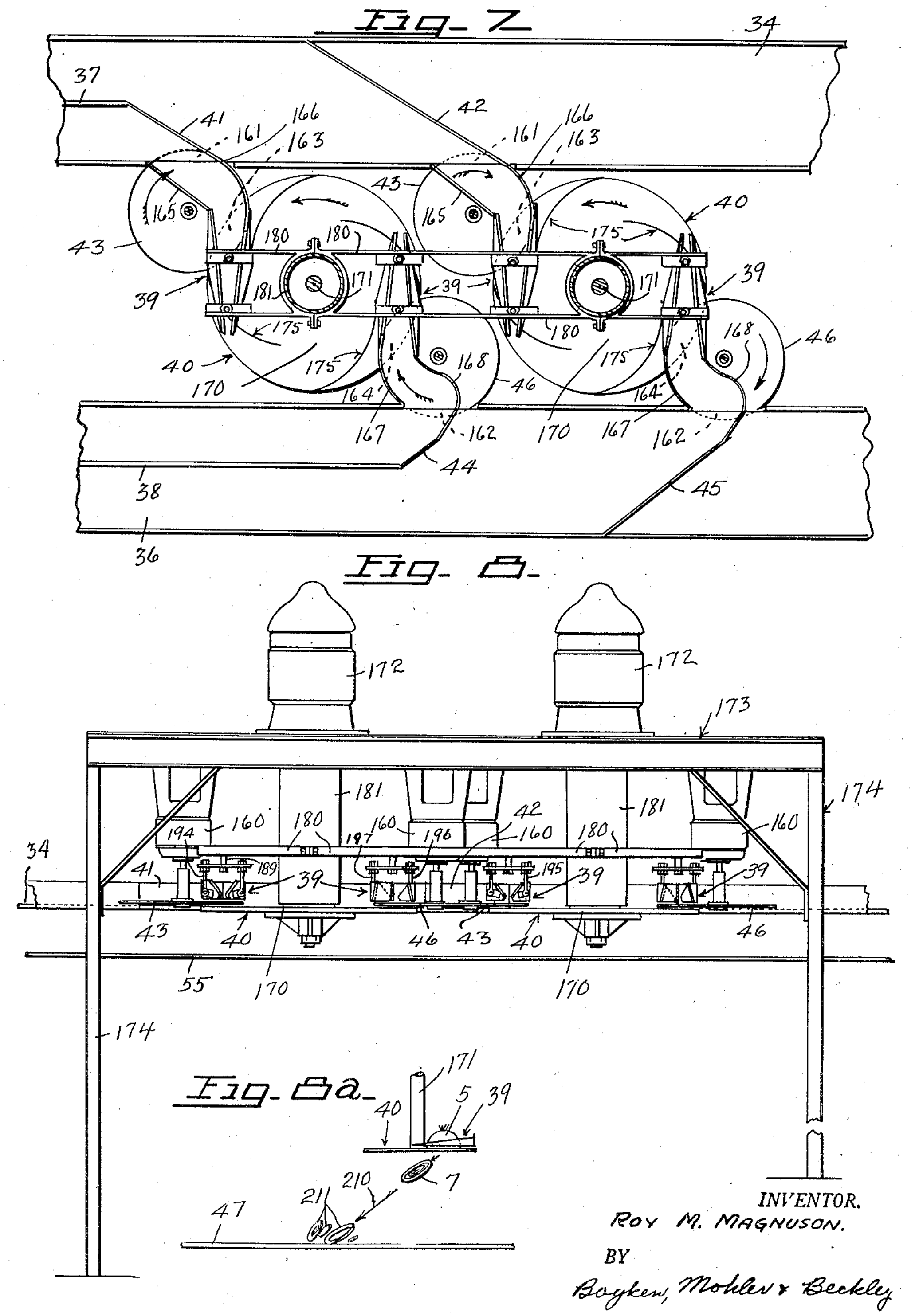
Fig. 7 is a sectional view showing the slicing knives or slicer mechanism that includes the transfer disks and conveyors associated therewith, but omitting the juice collectors for collecting and separating the juice resulting from slicing.
Fig. 8 is a side elevational view of the slicer mechanism omitting the near conveyor and juice collectors, but showing the frame and motors for the cutters and transfer disks.

Fig. 8*a* is a diagrammatic view showing the angular path of travel of slices cut by the cutters of Fig. 8 and showing how they strike the trays and break up into separate rings.

Figure 8B:
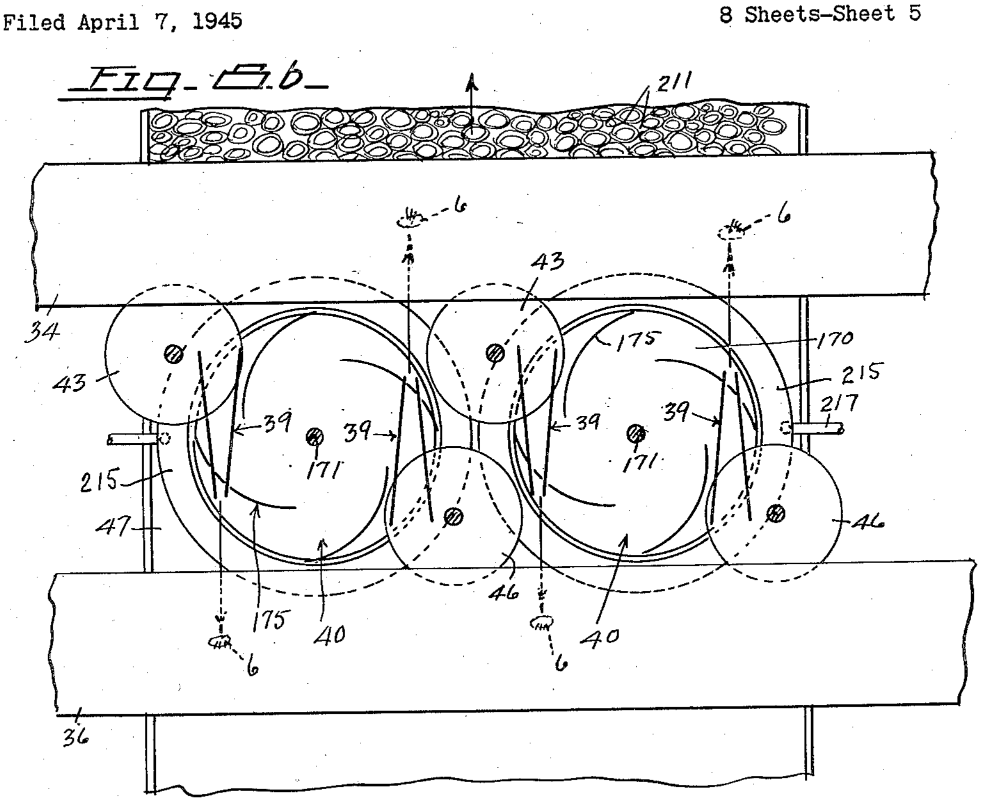

Fig. 8b is a semi-diagrammatic view showing the onion juice separators or collectors in plan around the cutters.

Figures 8C, 8D:
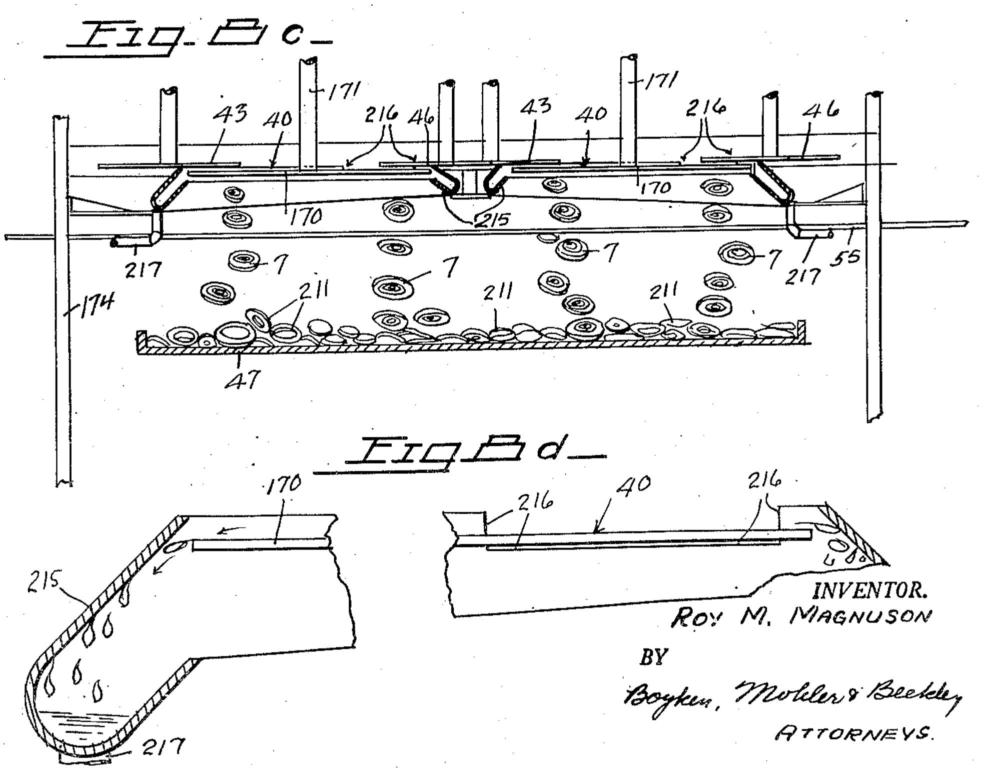

Fig. 8c is a semi-diagrammatic elevational view of the cutter showing the juice collectors in section.

Fig. 8d is an enlarged fragmentary sectional view of a portion of one of the juice collectors, the cutter being in elevation.

Figure 9:
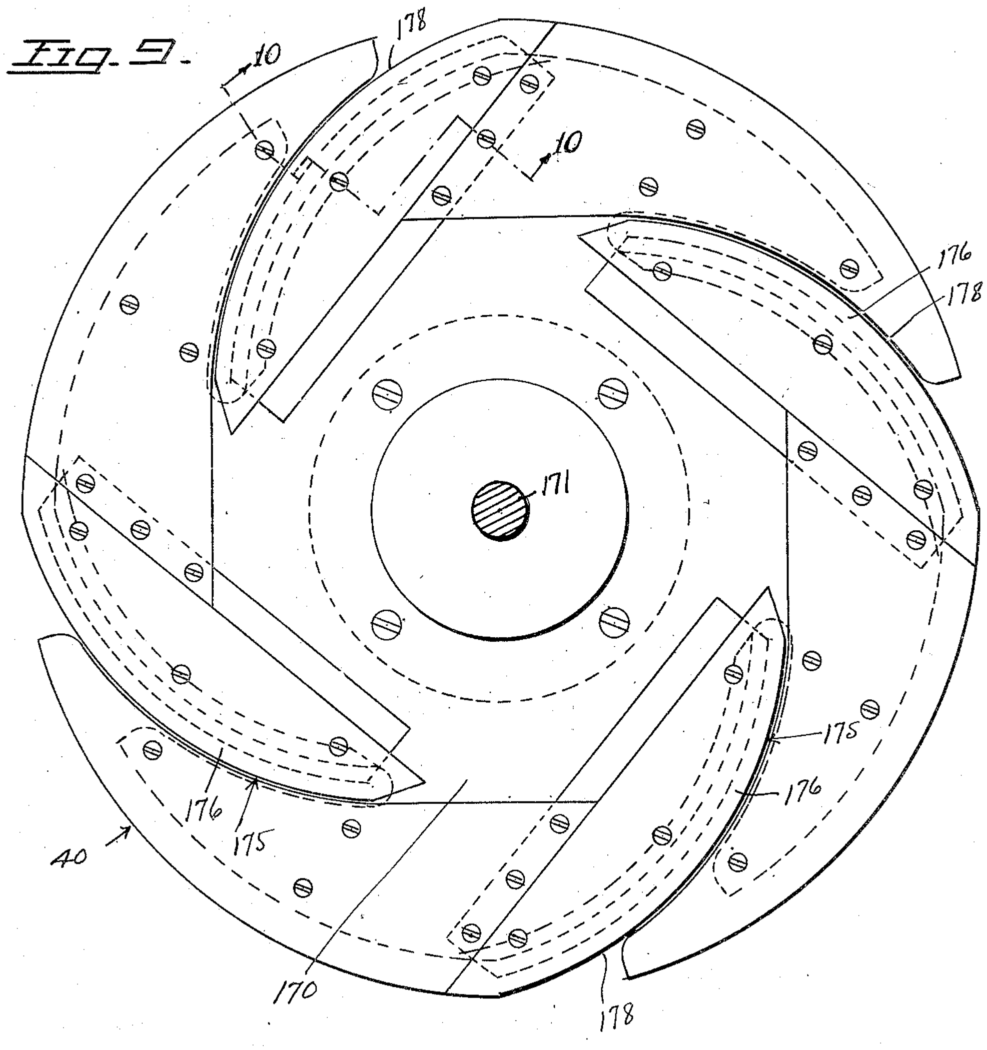

Fig. 9 is an enlarged plan view of one of the onion slicing knives, the central shaft being in section.

Figure 10:
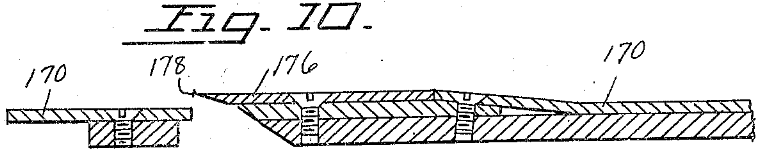

Fig. 10 is an enlarged sectional view taken along line 10—10 of Fig. 9.

Figures 11, 12, 14:
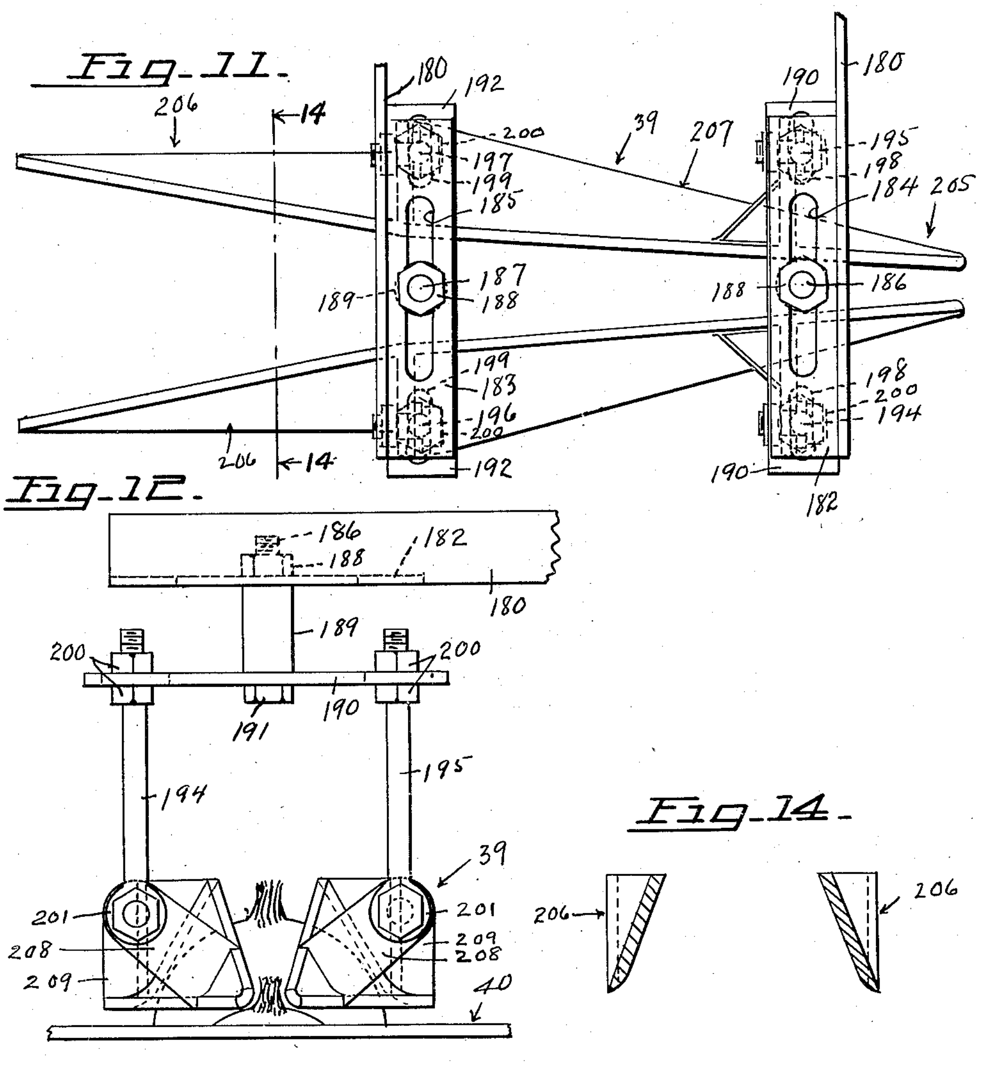

Fig. 11 is an enlarged plan view of one of the holders for onions during slicing of the latter.

Fig. 12 is an end view of the holder of Fig. 11 showing part of the slicing blade and showing the onion halves in position including a root or stem end ready for ejection.

Figure 13:
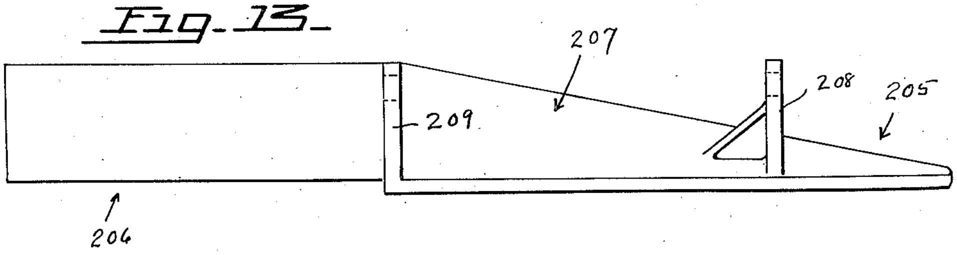

Fig. 13 is a side elevational view of the holder of Fig. 12 without the supports.

Fig. 14 is a sectional view taken along line 14—14 of Fig. 11.

Figure 15:
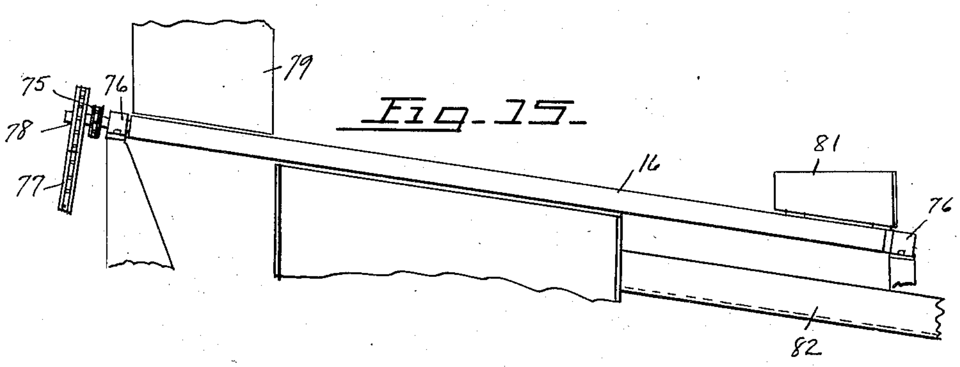

Fig. 15 is a fragmentary elevational view of the device for sorting onions for shape.

Figure 16:
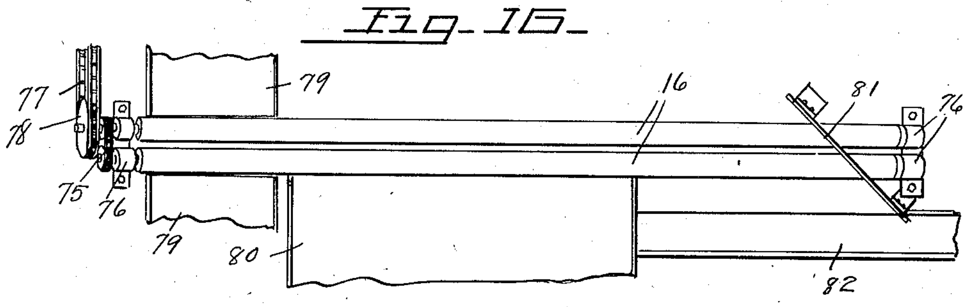

Fig. 16 is a plan view of a pair of the rollers of Fig. 15.

Figure 17:
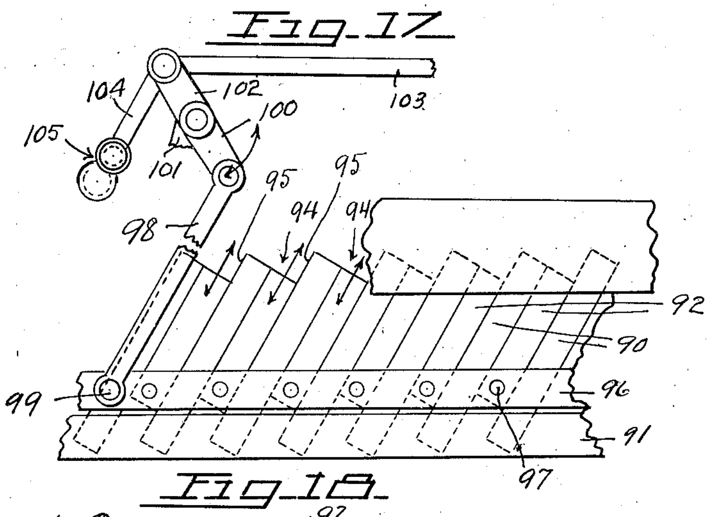

Fig. 17 is a fragmentary elevational view of one of the feeder and weight control devices.

Figure 18:
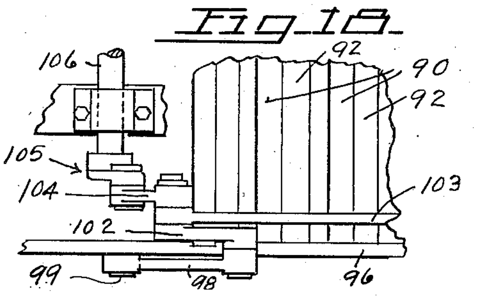

Fig. 18 is a fragmentary plan view of part of the device of Fig. 17.

Figures 1, 2, 3:
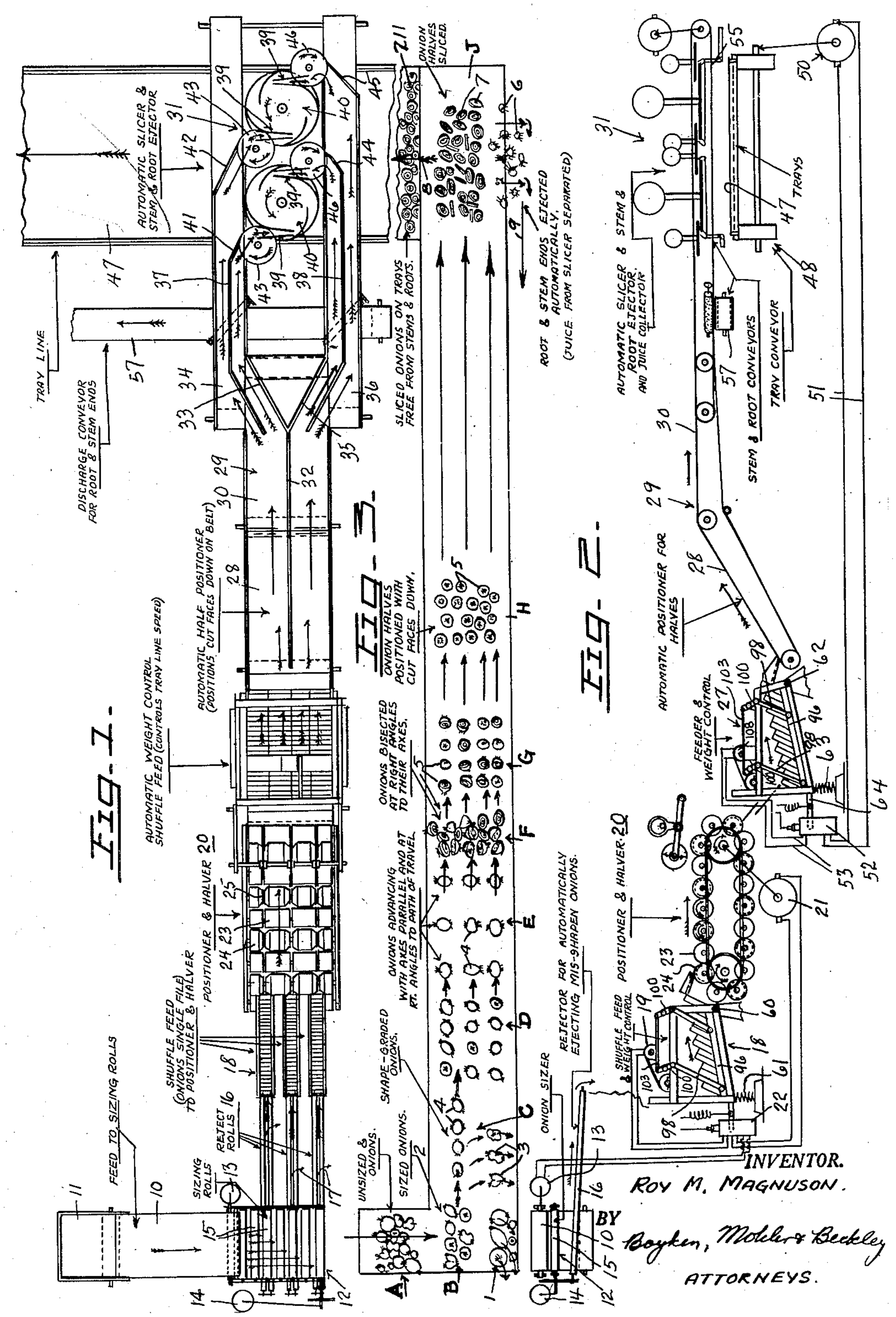
Fig. 2 is a diagrammatic elevational view of the system of Fig. 1.
Fig. 3 is a diagrammatic view showing the onions at various positions and in various stages of processing in the path of travel from the feeding of unsized whole onions to the slicing and distributing of the onions on the drying trays, including the final step of separating the stem and root ends from the sliced onions.

Before describing the mechanisms of the system whereby the method of handling the onions is accomplished, reference is made to Fig. 3 in which the steps of the process are shown independently of apparatus. At the left hand end of Fig. 3 is station A, at which station the onions are not graded for size or shape, but are indiscriminately mixed together. These onions are moved along a path of travel to station B at which point they are graded for size, the onions 1 of undesired size being ejected from said path of travel, while the onions 2 of the desired size being continued along said path of travel to station C where the misshapen onions 3 are ejected from said path. The onions 4 of desired shape are continued along the path of travel to station D where they are aligned and evenly spaced apart in equally spaced rows, all while moving in one direction in said path toward the next station E. At station E the onions 4 are arranged with their root-stem axes parallel and at right angles to the path of travel of the onions. This axial arrangement of the onions occurs without stopping them and without interrupting their spacing. As soon as they have their root-stem axes aligned as above described, the rows of coaxial onions are successively brought to station F where the onions in each such row are bisected transversely or at right angles to the root-stem axis of each onion, and the bisected halves 5 are then moved to station G where the halves 5 are arranged in a single layer instead of being piled up as they would tend to do after being bisected. From station G bisected onions 5 move to station H where said bisected halves are arranged with their cut faces down and coplanar. Thus the root and stem ends of the onion halves all face upwardly. From station H the halves 5 move to station J and at station J they are sliced from their cut faces toward their root and stem ends until said ends are reached, and then said ends 6 are automatically ejected separately from the slices 7 and the slices 7 move in one direction as indicated by arrow 8 to a dehydrator or for whatever treatment is desired, while the ends 6 move along a different path 9 to any desired point for discard or for further treatment as may be desired.

While the entire system of handling as above described is desirable, the handling as it occurs from stations E to J is particularly desirable and important. At no time in the entire system should there be any intentional or material stoppage in the movement of the onions along the predetermined path they follow. There may be a momentary stoppage of some of the onions just before they are actually spaced at station D and before the halves are uniformly spread out or arranged with their cut faces downwardly. Under normal conditions there is a constant movement of onions, halves or slices between stations A and J. At the feed end of stations D, G there is preferably a slight surplusage of onions and halves respectively when the normal run of onions is being handled inasmuch as there may be times when an abnormally large amount of undesirable onions may be rejected at stations B, C, and at such times this surplusage may be drawn upon at stations D, G, to insure a steady uniform weight of slices per minute at station J. Other means is provided to control the weight of onions that are moved to station J, as will later be explained more in detail.

Referring to Figs. 1 and 2, reading from left to right, apparatus is diagrammatically indicated for practicing the steps of the method above-described. The steps of the method as shown on Fig. 3 substantially correspond in position to the machine shown in Figs. 1, 2 for accomplishing said steps.

The ungraded and misshaped onions are carried by a feed conveyor 10 from a hopper for delivery onto a sizer 12. A motor 13 or any other desirable source of power may be connected with said conveyor for actuating the same.

The sizer 12 may be driven by a motor 14 and said sizer preferably comprises parallel pairs of spaced rollers 15 that are driven in the same direction by said motor for moving onions deposited thereon in a direction away from the conveyor 10. The spacing of said rollers is such that the onions of the desired size will pass between the same on to a device that may be termed "reject rolls," while undersized onions may drop between pairs of said rollers 15 before reaching the reject rolls, and oversized onions may be carried beyond the reject rolls. The sizer disclosed in copending application of J. H. Hume for United States Letters Patent, Ser. No. 509,984, filed November 12, 1943, and which application has become abandoned is preferably used.

The reject rolls are indicated at 16, being arranged in pairs that may be driven in the same direction by the motor 14 that drives the sizing rollers 15. These reject rolls are elongated and slightly inclined downwardly in a direction away from the sizer 12. An incline of about 8° relative to horizontal has been found to be satisfactory. With these rollers having a diameter of several inches and rotating at a speed of from about 250 to 300 R. P. M., the undesirable misshaped and double growth onions will be thrown off the rollers in the direction of arrows 17 (Fig. 1) while the desirably shaped onions will continue to travel downwardly on the rolls 16 for delivery onto the shuffle feed and weight control devices generally designated 18.

The shuffle feed devices 18 will each be more fully described later on, but it is sufficient to say that they function as a unit for spacing the onions delivered onto the same and for arranging said onions in several separate files or rows for intermittent movement longitudinally of the rows. Upon reaching the delivery ends of the devices 5, the onions in said rows are intermittently ejected into the troughs formed by the generally upwardly facing and adjacent convex sides of pairs of rollers of the onion positioning device generally indicated as 20.

A motor 19 (Fig. 2) may drive the feed devices 18 and a motor 21 may drive the onion positioning device and which motor as well as motor 19 are variable speed motors and electrically connected in a control box 22 in a conventional manner (not shown) for operating in a predetermined speed ratio, but which rates may be varied for obtaining the best results under all conditions.

The positioning device 20 virtually comprises an endless horizontally extending conveyor of rollers. Plain cylindrical rollers 23 alternate with annularly grooved rollers 24 (Fig. 1). Motor 21 moves the rollers of the onion supporting upper run in the direction of the arrow (Fig. 2). The timing between the feed devices 18 and the rollers of the positioner 20 is such that one onion is fed into the trough formed by each pair of rollers 23, 24 having the plain roller 23 as the leading roller of the pair. The feeding devices 18 correspond in number to the number of grooves 25 in rollers 24. The grooves are similarly positioned on rollers 24, hence provide parallel rows of spaced grooves extending longitudinally of the positioner and the feeding devices are generally aligned with said rows respectively.

As will later on be pointed out in considering the positioner 18, the rollers 23, 24 are rotated in the same direction, thereby causing rotation of the onions supported thereon at each groove 25 and this rotation of the onions causes them to rotate on their root-stem axes with the latter parallel with the axes of the rollers, all the while the onions are being carried bodily away from the feed devices 18 in a direction at right angles to their axes.

At the end of the positioner 20 that is opposite the feed devices 18, and over the said end of the positioner, is a row of cutters 26 that are connected by suitable means (later described in detail) for movement across the paths of the onions on the positioner for bisecting the onions at right angles to their axes.

The onions so bisected fall into another shuffle feed device 27 that functions to spread the bisected onions out uniformly so as to feed them at a substantially uniform weight per minute onto the lower end of an upwardly inclined end portion 28 of an endless belt generally designated 29. The opposite end portion 30 of said belt 29 is substantially horizontal (Fig. 2).

The inclination of portion 28 of belt 30 is such that the onions positioned on said portion with their flat or cut faces downwardly against the same will be carried up the belt and along the portion 30, without interruption, but those that have their convex sides against the portion 28 will roll down the belt until they strike a properly positioned half and are inverted or until they are tumbled at the lower end of the belt to inverted position. The number of halves requiring inversion and the speed with which such inversion is accomplished is sufficiently uniform during a normal operation of the machine to maintain a substantially uniform weight per hour of halves on the horizontal portion 30 of belt 29.

The properly positioned onion halves on the horizontal portion 30 are substantially uniformly distributed over such portion and these halves are carried to the slicer 31 where the halves are cut into slices commencing with their downwardly facing flat faces.

Preferably an upstanding partition 32 over portion 30 (Fig. 1) divides the layer of onions distributed on said portion and half of the onions on the portion 30 are shunted by a shunt wall 33 onto one end of an endless belt 34 while a shunt wall 35 shunts the other half onto one end of an endless belt 36.

A partition 37 (Fig. 1) on belt 34 and a similar partition 38 on belt 36 divides the flow of onion halves on the belts 34, 36 for distribution of the halves to a plurality of holders 39 (in this instance four holders are provided) where the onions are sliced by rotary cutters 40. Shunt walls 41, 42 over belt 34 direct the onions at opposite sides of partition 37 to two of said holders over intermediate transfer disks 43. Shunt walls 44, 45 over belt 36 respectively direct the onion halves at opposite sides of partition 38 to two of said holders 39 over intermediate transfer disks 46. Transfer disks 43, 46 accelerate the speed of onions thereon to nearly the speed of the cutters.

The onion slices are thrown from high speed cutters 40 onto trays 47 so as to strike the trays at an angle of substantially less than 90° thereby causing the rings in each slice to separate from each other (Fig. 8*a*). The said cutters are arranged so that the rings will be uniformly distributed on the trays. By separating the rings in the slices from each other the drying process is greatly expedited and uniformity of drying is effected. A motor 50 (Fig. 2) connected with conveyor 48 drives the latter at the desired rate of speed for proper distribution. The cutters preferably have a peripheral speed of from about 2000 to 7000 feet per minute.

The motor 50 is electrically connected by wires 51 with an electrical control system in a control box 52 and which system may include the wires 53 from motor 54 that operates the shuttle feed device 27.

The holders 39 in the cutting apparatus 31 are so arranged as to release the root and stem ends of the onion halves as soon as said ends are substantially all that remains of each half after the desired slices are dropped onto the trays. This structure will be explained in detail in the description of the cutting machine.

The root and stem ends released from the holders are ejected onto conveyor 55 which may be the lower runs of belts 34, 36 respectively or separate conveyors. Such ends may be discharged from said belts onto a single conveyor 57 or into any suitable collecting chute or the like. Thus an automatic separation of the root and stem ends from the desirable slices is effected.

Inasmuch as it is highly desirable that the onion slices on the trays be evenly distributed so as to obtain the maximum efficiency of the system, such control may be accomplished in one of two ways or by both according to the conditions encountered. Such conditions may be more or less variable according to the uniformity or lack of uniformity of the onions at the feed hopper 11 where the initial feeding of onions to the sizer 12 occurs.

The motors 19, 21 are so connected in the electrical system so that they will speed up or slow down together in a direct ratio. These motors and motor 13 are variable speed motors, such as conventional shunt motors in which the flux is varied by means of a rheostat in the shunt field circuit and which rheostat may be in control box 22 and actuated by movement of the feed devices 18 about a horizontal pivot 60 under the weight of onions delivered onto said devices. A balance spring 61 may support the receiving end of each of said feed devices so that a reduction in weight of onions on the receiving ends of said devices will permit their receiving ends to rise, while an increase in weight will cause a lowering of said ends. In this manner, it being known in advance the weight of slices per minute that must be deposited on trays 48, the speed of delivery of onions to the positioner 20 and the delivery of onion halves from the latter can be controlled to insure the correct weight of onions on the trays. A large percentage of misshapen onions or onions of undesirable size being fed to the sizer and reject rolls would result in fewer onions being delivered to the feed devices 18 than is desired, therefore the upward movement of the latter under the influence of spring would result in actuation of the rheostat in box 22 for increasing the speed of motor 13 to increase delivery of onions to the sizer and reject rolls so as to make up the deficiency.

Under certain circumstances the speed of the tray conveyor 48 may be increased or decreased in response to weight variations in the onions delivered onto the feed device 27, the latter being pivoted at 62 for movement of the receiving end up and down on balance spring 63 as said variations occur. The arm 64 may move with said feed device and actuate a rheostat in box 52. Of course motor 50 may be a variable speed motor the same as motor 13 and its speed will vary directly as the weight on device 27 varies. If the weight of onions passing over said device 27 is below normal, the tray conveyor will slow down and if it is above normal the reverse occurs.

From the foregoing description, it is seen that the method disclosed automatically spaces the whole onions and positions them with their root-stem axes parallel while moving them in a predetermined path of travel at right angles to their axes. While so moving in said path they are bisected at right angles to their axes and the halves are then similarly positioned with their cut faces coplanar for slicing from said cut faces toward their root and stem ends. The said positioning of said halves and said slicing is automatically done as well as the conveying of the halves from the first positioner and halver to the slicing point. The further step of automatically separating the root and stem ends from the slices is accomplished at the slicing station.

There are other steps in the method such as the sizing of the onions and the automatic rejection of misshapen or double growth onions, also the control of the weight of onions being handled and the final distribution of slices. These steps are preferably included, particularly the latter one. Should the onions be field-graded or pre-graded before delivery for slicing, the first steps would not be repeated.

*The reject rolls 16*

In Figs. 15, 16 a pair of these rolls 16 are shown more in detail. There may be any number of these pairs according to the capacity of the sizer 12 that feeds the sized onions onto the upper ends of said pairs.

Rolls 16 may have friction surfaces such as would be provided by relatively soft rubber or the like, or by a slight surface grain if harder material were used. They are elongated and inclined about 8° relative to horizontal and are connected as by a chain 75 for rotation in the same direction. Bearings 76 at the upper and lower ends of the rollers may support them for rotation and a drive chain 77 connected with a sprocket 78 on one of the roller shifts may constitute the driving means, said chain being connected with a source of power (not shown).

The onions dropping between the sizing rollers 15 that are above the upper ends of rolls 16 are carried and directed to pairs of rolls 16 by chutes 79. In travelling down the rolls 16 the misshapen and double growth onions are bounced laterally from the rolls and will fall onto a conveyor chute 80 or the equivalent, while the onions of the desired shape may either continue downward and over the lower ends of the rolls onto feed devices 18, or a shunt board or plate 81 may deflect the onions from the rolls onto a delivery chute 82 that in turn feeds the onions to the feed devices 18.

As already mentioned, it has been found that the desired rate of speed of the rolls 16, where they are several inches in diameter, is from about 250 to 300 R. P. M. Such rolls will handle onions from about one to several inches in diameter.

Assuming the rolls are say about six feet in length, the misshapen and double growth onions will practically all be ejected therefrom within about thirty inches from the place they first engage the rolls. Thus there is ample length to feed a large quantity of onions to said rolls and to eject the undesirable ones therefrom.

*Shuffle feed devices 18, 27*

These will be considered as being the same inasmuch as the elements and manner of operation are the same, although there may be variations in proportions or sizes of the feeding elements. Apart from the pivotal mounting of these devices on pivots 60, 62 respectively (Fig. 2) and the springs 61, 63 and their connection with control boxes 22, 52 for regulating motor speeds, as already described, no claim is made to said devices in themselves apart from the combination.

As seen in Figs. 17, 18, said devices comprise a plurality of inclined, parallel plates 90 that are stationary relative to a supporting frame member 91 to which they may be secured. Between each adjacent pair of said plates 90 is a plate 92 that is reciprocable in a plane parallel with the planes of the adjacent stationary plates 90.

Plates 90, 92 are so arranged that the upper ends of adjacent pairs thereof coact to define troughs 94 (Fig. 17) when plates 92 are at the lower ends of their strokes, each trough being adapted to hold an onion or onion half therein. Upon upward movement of plates 92, the onions so supported will be moved upwardly by said plates 92 and over the inclined upper sides 95 of plates 90 for falling into the adjacent trough that is at the side of each plate 90 toward which it inclines.

The plates 92 are connected with each other by means of bars 96 and pivots 97 whereby upward movement of such bars will cause simultaneous upward movement of the plates 92. Upwardly extending links 98 are pivotally connected at their lower ends to bars 96 as at 99 (Fig. 17) and the upper ends of said links are respectively pivotally connected to one arm 100 of rockers that are in turn pivotally secured to frame member 101. The opposite arms 102 of the rockers are connected by a link 103 and one of said arms 102 is also connected by a link 104 with a crank 105. Crank 105 may be secured to a drive shaft 106 mounted on any suitable frame member 107 of said shuffle feed device and which shaft may be driven by motor 19 in the case of each shuffle feed device 18 or by a motor 108 in the case of feed device 27.

In operation, rotation of shaft 106 will result in reciprocation of the plates 92 simultaneously and the feeding of onions over the upper ends of plates 95 toward one end of each feed device will commence. The onions may be indiscriminately arranged as they are fed out the receiving ends of the feed devices that are respectively adjacent the reject rolls 16 and the positioning and bisecting device 20, but these onions quickly become spaced, one in each trough 94 in the case of feed devices 18, or one row in each such trough in the case of the feed device 27. This difference is due to the fact that plates 92 in feed device 27 may be quite wide as compared with those in the feed devices 18. Furthermore, feed device 27 functions more as a leveller or uniform distributor than as a precise positioner as well as spacer. The feed device 18 must feed one onion at a time to exact positions on the positioner 20 which is not the case with the device 27.

*The onion positioner and halver 20*

As has already been generally stated, this positioner 20 virtually comprises an endless horizontally extending conveyor made up of rollers 23, 24 (Figs. 4 to 6), the rollers 23 alternating with rollers 24 and being plain, while rollers 24 are formed with grooves 25.

Figure 6:
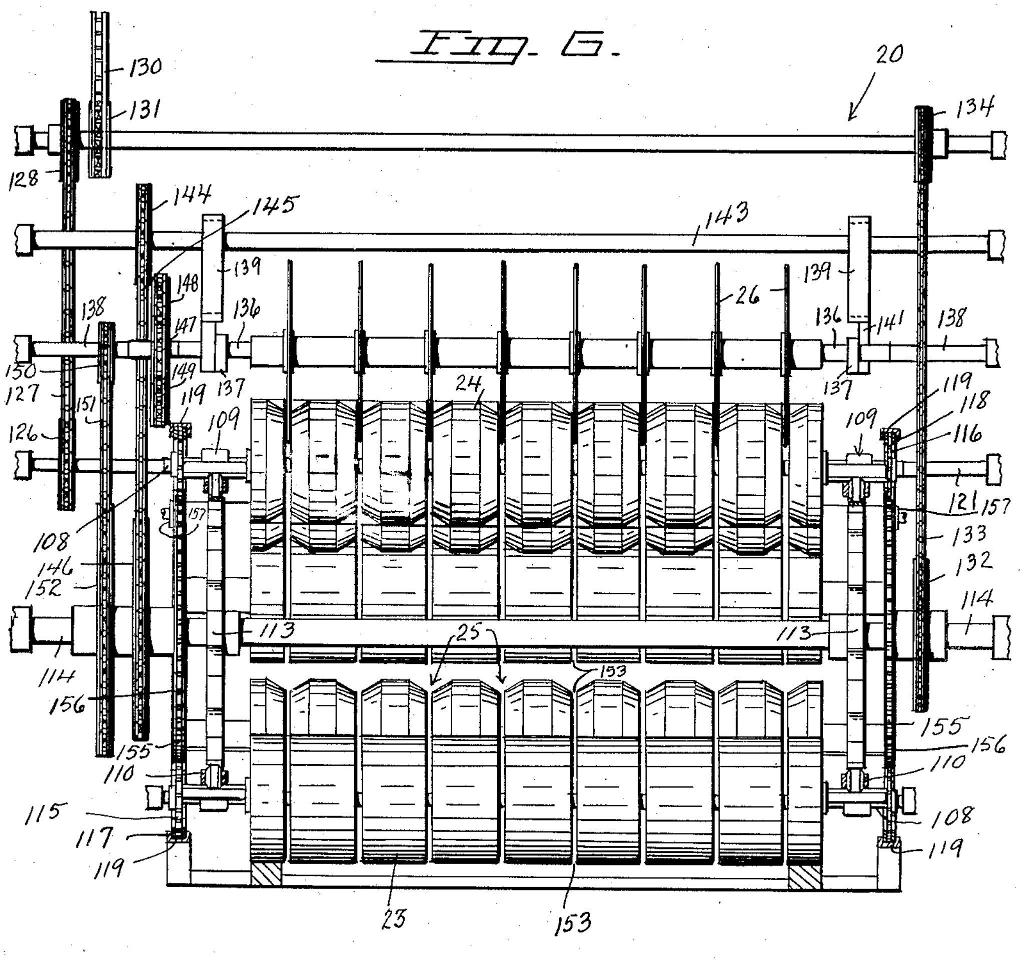
Fig. 6 is a sectional view taken substantially along line 6—6 of Fig. 4.

The rollers 23, 24 are respectively secured on shafts 107, 108 and bearings 109 at opposite ends of said shafts are carried on endless chains 110. A pair of sprockets 111 (only one shown) at the feed end of the positioner (Fig. 4) are secured on a shaft 112 and support one of the ends of chains 110, while a second pair sprockets 113 at the discharge end of the positioner secured on shaft 114, support the opposite ends of said chains (Figs. 4, 6).

A sprocket 115 is secured on one end of each shaft 107 at one side of the positioner outwardly of the chain 110 adjacent thereto, while a corresponding sprocket 116 is secured on one end of each shaft 108 at the opposite side of the positioner, also outwardly of chain 110 with respect to the main body of the machine that is between the chains.

An endless drive chain 117 extends over sprockets 115 and an endless chain 118 extends over sprockets 116. The upper and lower horizontally extending runs of these chains that are parallel with the upper and lower runs of chains 110 are held in engagement with the sprockets along said runs by channel strips 119 that enclose each of said runs of the chains 117, 118.

Figures 4, 5:
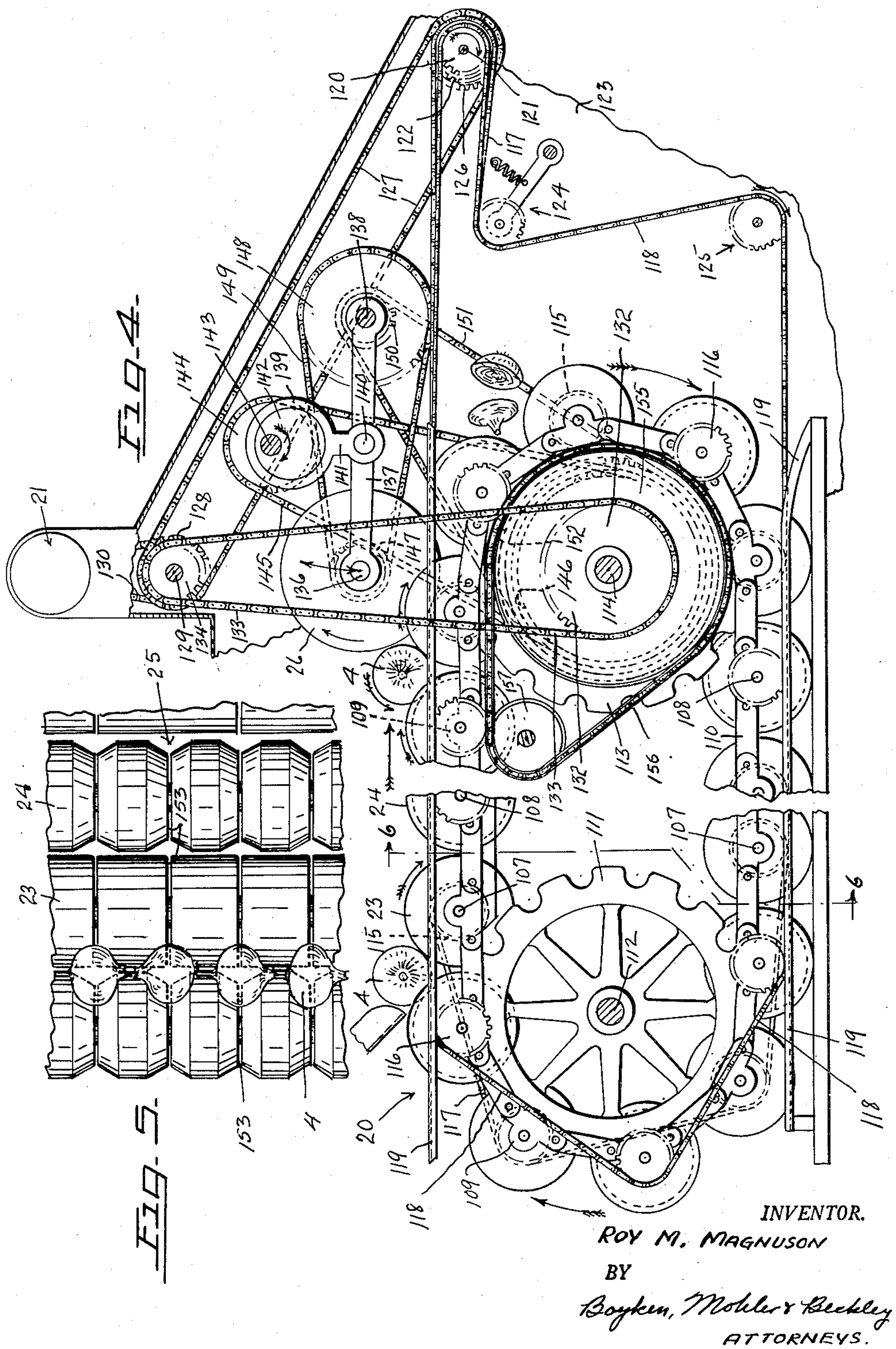
Fig. 4 is a part-sectional, part-elevational view of the machine for automatically positioning and bisecting the onions.
Fig. 5 is a fragmentary plan view of several of the onion positioning rollers of the machine of Fig. 4 with several onions positioned thereon.

The surface or peripheral speed of the grooved rollers 24 is faster than that of the plain rollers 23 and this is accomplished by having chain 117, that is in engagement with the sprockets 115 that are on the shafts carrying the grooved rollers, extend over a sprocket 120 on a shaft 121, while the chain 118 extends over a sprocket 122 on said shaft 121 that is larger in diameter than the sprocket 120 (Fig. 4). The shaft 121 may be rotatably supported in any suitable bearings (Fig. 6) carried by a housing or frame 123 (Fig. 4) that also supports shafts 112, 114 and other shafts hereinafter mentioned, as will later appear.

After passing over sprockets 120, 122 (Fig. 4) the chains 117, 118 may pass over tighteners generally designated 124, idlers 125 and then back to channels 119.

Shaft 121 that carries sprockets 120, 122 also carries a sprocket 126 that is driven by a chain 127. Chain 127 extends over a sprocket 128 on shaft 129, said shaft 129 being driven by motor 21 through chain 130 that connects the said motor with a sprocket 131 (Fig. 6) on said shaft 129. The direction of rotation of sprockets 120, 121 is such that the upper halves of the rollers 23, 24 in the upper run of the positioner move in the same general direction as said rollers are moved by chain 110.

Shaft 114 that carries sprockets 113 over which chains 110 extend also carries a sprocket 132 that is connected by chain 133 with sprocket 134 on shaft 129, whereby motor 21 will drive chains 110 that carry rollers 23, 24.

Upon actuation of motor 21, it is seen that the onions 4 deposited on the left-hand end of the positioner as seen in Fig. 4, will be carried from said receiving end to the right toward the discharge end that is adjacent sprockets 113. At the same time the onions 4 which are supported at two points on the sides of the grooves 25 and at substantially one point on the leading plain roller 23 of each supporting pair of rollers will be rotated in a direction reverse to that of the rollers. This rotation and difference in peripheral speed of rollers 23, 24 causes the onions to have their root-stem axes parallel and at right angles to their bodily travel as seen in Fig. 5. The three point support for the onions is important as is the difference in peripheral speed of the rollers.

While the onions are moving as above described with their axes parallel to the axes of rollers 23, 24, they are in a position to be bisected. The three point support for each of the onions very accurately aligns them for cutting.

The bisecting of the onions occurs over the sprockets 113 adjacent the discharge end of the positioner by means of rotary knives 26. There is one knife for each of the grooves 25 (Figs. 4, 6) and these knives are coaxial and spaced on a supporting shaft 136 that is above the positioner rollers.

Shaft 136 is rotatable in bearings journalled in the corresponding ends of a pair of arms 137. The opposite ends of said arms 137 are pivotally supported on a rotary shaft 138 that is carried by the frame 123 of the positioner. Thus the arms may oscillate on shaft 138 for simultaneous swinging of the knives 26 downwardly and upwardly into and out of the paths of onions 4 as the latter are carried on rollers 23, 24.

Intermediate their ends the arms 137 are suspended from eccentric straps 139 by pivots 140 on said arms in pivoted engagement with downward projections 141 of said straps.

The eccentric straps 139 enclose eccentrics 142 secured on shaft 143. Thus upon rotating shaft 143 the arms 137 carrying knives 26 will be oscillated generally vertically within the limits of the eccentrics.

The shaft 143 has a sprocket 144 secured thereon and which sprocket is connected by a chain 145 with a sprocket 146 secured on shaft 114. Thus, upon driving shaft 114 by motor 21, the eccentric 142 will be rotated and the driving connection between said shaft 114 and the eccentric is so arranged that the knives 26 will be swung downwardly, as each row of axially aligned onions reach a position in which such downward movement will bisect the onions as the latter continue past the knives. As soon as the onions are bisected the eccentrics 142 will lift the knives 26 for the next row of axially aligned onions on the positioner.

During oscillation of the knives 26, they are also rotated. This rotation is effected through sprockets 147, 148 that are respectively secured on shafts 136, 138 and that are connected by chain 149.

Shaft 138 also carries a sprocket 150 that is connected by a chain 151 with a sprocket 152 on shaft 114. The relative sizes of sprockets 147, 148, 150 and 152 are such that the circular knives 26 are rotated at a relatively high speed.

The movement of the knives 26 bodily across the paths of the onions and their high rotating speed results in their bisecting the onions cleanly and without dislodging or upsetting the positions of the onions during the bisecting operation.

In order that the onions may be cleanly and completely bisected during each downward cutting stroke of the knives, the rollers 23, 24 are formed with kerfs or very narrow grooves 153 to receive the edges of the knives at the lower end of their downward strokes. These kerfs do not modify the three-point support received by the onions as previously explained, as the kerfs are merely wide enough to freely receive the knives so as to permit the latter to cut through the onions without engaging the roller.

One each end of shaft 114 is a circular synchronized disk 155 having a chain 156 extending therearound and over an idler 157 (Fig. 4), the hub of each disk being free on shaft 114 to permit rotation independent of the shaft 114. The chains 156 of these disks are respectively in mesh top and bottom with at least one each of sprockets 115 and 116 that are being power-driven through chains 117, 118. Thus the disks themselves are power-driven and the sprockets 115, 116 that are not connected with chains 117, 118 will be driven at the same speed as those that are. Thus when the rollers 23, 24 are carried around sprockets 113 from the upper to the lower run of the positioner they will not stop and their drive by the lower runs of chains 117, 118 will be re-established without imposing any objectionable strain on the chains. This is important.

*Slicer 31*

Figs. 7 to 10 inclusive show the slicing machine or apparatus more in detail, and Figs. 11 to 14 inclusive show the holders for the onions during their slicing, and Fig. 12 illustrates most clearly the manner in which the root and stem-ends are ejected.

The shunting of the onion halves from belts 34, 36 to rotary cutters 40 by way of transfer disks 43, 46 has been generally explained.

The transfer disks 43, 46 are identical with each other in structure, each being preferably driven from above by its own motor 160 (Fig. 8) in the direction of the arrow indicated on each disk in Fig. 7. One marginal portion 161 of each transfer disk 43 extends just below belt 34 adjacent the shunt walls 41, 42 respectively. The disks 46 that are adjacent belt 36 likewise have a marginal portion 162 extending under said belt.

The rotary circular cutters 40 are each between one of the transfer disks 43 and one of the disks 46. In other words, one set of transfer disks comprising one disk 43 and one disk 46 is provided for each rotary cutter 40 at opposite sides of each cutter. Onion halves (face down) are fed onto one set of transfer disks by shunt walls 41, 44, while onion halves are fed onto the other set of transfer disks by shunt walls 42, 45.

A marginal portion 163 of each of the transfer disks 43 extends over a marginal portion of each rotary cutter 40 at one side of the central axis of the latter and a marginal portion 164 of each of the transfer disks 46 extends over a marginal portion of each cutter at the opposite side of said central axis. (Fig. 7.)

The direction of movement of the transfer disks is such that onion halves carried thereon from belts 34, 36 to cutters 40 will be moving in the same general direction as the cutters 40 at marginal portions 163, 164 on the disks. Spaced guide strips 165, 166 over disks 43 guide the onions onto the rotary cutters, while spaced guide strips 167, 168 over disks 46 perform a similar function.

The rotary cutters 40 are identical. Each comprises a circular disk 170 centrally secured on the lower end of a drive shaft 171 that extends downwardly from a motor 172. Motors 172 are secured to a frame 173 that carries the same and the cutters and supports the upper sides of said disks 170 in proper relation to disks 43, 46 that are also carried on said frame. The legs 174 of said frame may support the transfer disks in proper relation to belts 34, 36 (Fig. 8).

Each disk 170 is formed with a plurality of slits or slots 175 extending arcuately inwardly from the edge of the disk and generally about equally spaced similar axes equally spaced from each other and from the central axis of each disk 170, (Fig. 9).

Along the convexly curved edge of each slot and defining said edge is a removable cutting blade 176 having a convexly curved cutting edge 178 spaced above the main plane of the disk 170. Thus upon rotation of the disk 170 with the convex edges 178 leading, any onions on said disk and in the paths of said edges 170 will be sliced by each of said blades 176 (Figs. 9, 10).

In the drawings, each rotary cutter has four equally spaced cutting blades and the cutting edges of these are so arranged that onions being cut tend to be forced radially outwardly of the central axis of the disk.

The holders for onions, generally indicated at 39 in Figs. 7, 8, are shown in detail in Figs. 11 to 14 inclusive.

Holders 39 are suspended over the marginal portions of the circular cutters 40 from a pair of supporting members 180 that are in turn secured to tubular housings 181. These housings are secured to the motors 172 or to frame 173 as may be desired. The members 180 of said pair may respectively be formed with several horizontal pieces 182, 183. Said pieces are in pairs opposed to each other at opposite sides of each of the housings 181, there being one pair of pieces 182, 183 to each of the holders 39. The members 180 and pieces 182, 183 thereon are parallel and each pair of pieces 182, 183 is arranged over opposite marginal portions of each cutter 40 about midway between the belts 34, 36.

A slot 184 is formed in each piece 182 extending longitudinally thereof and a similar slot 185 is formed on each piece 183 (Fig. 11). The upper end of a vertical bolt 186 extends through each slot 184 and the upper end of a vertical bolt 187 extends through each slot 185. A nut 188 in on each bolt 186, 187 above pieces 182, 183 and a spacer 189 is below each such piece (Fig. 12).

A horizontal elongated plate 190 is secured intermediate its ends on the lower end of each bolt 186 between the head 191 of the bolt and the spacer 189, while a horizontal elongated plate 192 is secured intermediate its ends on the lower end of each bolt 187 between the head of said bolt and the spacer thereon.

Depending from the ends of each plate 190 are a pair of vertical bolts 194, 195 and a similar pair of vertical bolts 196, 197 depend from the ends of plate 192. The bolts 194, 195 extend through slots 198 in plate 190 and bolts 196, 197 extend through slots 199 in plate 192. The slots in each plate extend longitudinally thereof and nuts 200 on the bolts 194 to 197 inclusive above and below plates 190, 192 releasably secure the bolts to said plates for adjustment of the bolts longitudinally of the slots as well as axially of the bolts.

The lower ends of bolts 194 to 197 inclusive are formed with horizontally directed eyes 201 (Fig. 12) for bolting said lower ends to the holders 39. Thus the bolts 186, 194, 195, 196, 197 form hangers for each holder. The bolts 194, 196 are spaced from similar sides of bolts 186, 187, while bolts 195, 197 are spaced from the opposite similar sides of said bolts 186, 187. The holders 39 are in two halves, one of which halves is carried by bolts 194, 196, while the other half is carried by bolts 195, 197. Thus, by adjusting bolts 195, 197 toward or away from bolts 194, 196, the halves may be moved closer together or farther apart and by adjusting the nuts 200 axially on bolts 194 to 197 the halves may be moved toward or away from the rotary cutter therebelow. The bolts 186 provide for bodily adjustment of the holders toward or away from the central axis of the rotary cutters. It is thus seen that the holders and the halves thereof are capable of being adjusted to meet every condition.

The halves of holders 39 are complementary to each other and each half comprises a specially formed plate having what may be called a toe portion 205 and a heel portion 206 an intermediate body portion 207 (Figs. 11, 13). Between the toe portion and body portion of each half is an ear 208 that is apertured for bolting to the eye at the lower end of one of bolts 194, 195 as the case may be, while an ear 209 is between the heel and body portion of each half is apertured for bolting to the eye at the lower end of one of the bolts 196, 197.

The heel portions 206 of the halves of each holder connects with the guides 165, 166 (Fig. 7), or with guides 167, 168 according to the positions of the holders, inasmuch as the onions enter the holders between said heel portions. Said heel portions in each holder may be horizontally elongated flat plates that are preferably inclined between 60° and 70° relative to horizontal (Fig. 14) with their opposed surfaces facing generally downwardly. The lower edges of the heel portions of each plate are slightly higher than the lower edges of the body and toe portions so as to clear the transfer disks 43 over which said heel portions extend.

The body portions 207 of each holder are flat plates integral with the respective heel portions and are in continuation thereof, but they are preferably inclined relative to horizontal no more than 60° (Fig. 12). The vertical width of the plate forming the body portion of each half is progressively less in direction toward the toe portion. The upper edge of the body portion of each half is inclined to provide for thus decreasing width while the lower edge is horizontal and substantially parallel with the cutter therebelow, it being understood that the body and toe portions of the holders are directly over the marginal portions of the circular cutters.

The toe portion 205 of each half is merely a continuation of the body portion, and the upper and lower edges of each toe portion also continues in alignment with the upper and lower edges of the body portion. The plates comprising the body and toe portion of each half of each holder come to a substantial point at the outer end of the toe portion, and the lower marginal portions of the opposed body and toe portions of each holder are turned oppositely outwardly so as to form rounded lower edges on said holder.

The onion halves upon being directed between the heel portions of each holder are moving at substantially the same speed as the speed of the cutters, therefore upon said onion halves passing onto the cutters from said transfer disks, the said halves will not be upset by contact with the cutter blades before the same are held against the downwardly inclined sides of the body portions of the holders during actual slicing.

In Fig. 12 an onion half 5 is shown at the beginning of the slicing operation. As the holders 39 are quite close to the outer edges of the circular cutters 40 the onion halves are positioned where the speed of travel of the cutting blades is fastest and the arcuate linear contour of the cutting edges is such that the slicing is accomplished progressively across the body of each onion half in direction generally radially relative to the axis of each cutter.

As the slicing of each half continues from the cut face toward the root or stem end, the halves continue to move in the holders toward the toe of each until the root or stem end 6 (Fig. 12) is all that is left, and at this point said root or stem end is at a level where it is released from engagement with the holder for ejection from the cutter by centrifugal force. The fact that the holder is in halves that are spaced apart provides an opening between the apices of the toe portion for permitting the upstanding or projecting tuft from the root or stem ends to pass through said opening.

The force with which the root and stem ends are ejected from the cutters is sufficient to throw said ends onto conveyors belt 55 (Fig. 2) which may be the lower runs of conveyors 34, 36, or they may be separate conveyors should there be any objection to depositing the said ends on the inner sides of said belts 34, 36. In any event, the root and stem ends are automatically separated from the onion slices. The latter, as they fall from the cutters, will be deposited on the trays moving therebelow and the distribution of the holders and cutters is such as to insure a substantially uniform distribution of the slices on the trays.

In Fig. 8*a* one of the cutters 40 is indicated with an onion half 5 thereon. The slices 7 are seen to follow the downward path 210 that is at less than a right angle with respect to tray 47 and the plane in which the slices 7 are disposed while in said path is such that the edge of each slice strikes the tray instead of the slices dropping in horizontal planes. The peripheral speed of the cutters at the point where the slices are cut is from about 2000 to about 7000 feet per second and this has a great deal to do with the path taken by the slices.

The angle at which the slices strike tray 47 and their velocity results in each slice separating into its rings 211, thus producing a layer of separate onion rings on the tray through which the drying air can readily circulate. Drying is uniform as a result and one of the heretofore baffling problems is solved.

The importance of this uniform drying is readily apparent when it is considered that the onion slices are eventually dried to the point where they contain less than 5% moisture by weight. In the conventional methods heretofore used some slices might break up into separate rings on the trays, while others remained whole, and still others were in stacks or at least in pairs flat together thus making it almost impossible to effectively dry them. By the time the slices that were separated into rings had dried to the desired degree, those slices that were whole and in stacks or pairs might contain from 6 to 10% moisture by weight and even more. Thus, to make the average moisture content 5% or less would result in some of the onions being practically charred while others were still relatively moist.

By the present invention as above described, the thickness of the layer of onions on the tray may be increased over previous methods and uniform drying will still be accomplished. It might be added that the breaking of the onion slices into rings also produces a greater uniformity in the layers, whereas heretofore the layers were somewhat spotty inasmuch as the onion slices tended to stay on the tray in files directly below the cutters.

In the cutting of onions it has heretofore been the practice to permit the water or juice to mix with the slices. In fact, it has been unavoidable in most instances. Where the cutters have a relatively high peripheral speed, as in the present instance, this moisture is thrown off by centrifugal force and is collected in the annular trough 215 (Fig. 8*b*) that surrounds each of the circular cutters. The trough is disposed outwardly of the periphery of each cutter (Fig. 8d) a sufficient distance so as not to interfere with the falling slices 7 (Fig. 8*c*) that are cut close to the periphery of each cutter. At those points around each cutter where the root and stem ends 6 are thrown off (Fig. 8*b*) the upper outer edge of the outer side of each trough is cut away as at 216 (Fig. 8*d*) so as not to interfere with the discharge of the said root and stem ends.

From the foregoing description it is seen that a triple action automatically occurs in the slicing step, namely (1) the free moisture resulting from the slicing step is separated from the cut slices, being carried off by any suitable conduit 217 leading from the lower portion of each trough or collector 215; (2) the root and stem ends are automatically separated from the slices and (3) the slices are broken up into their separate rings.

The ultimate end accomplished by these triple steps is a fast and uniformly dried quantity of sliced onions, inasmuch as the slow drying and undesirable stem and root ends are eliminated, and the water or free moisture due to cutting is taken away, and the slices are separated into separate rings. By referring to the stem and root ends as being undesirable, I mean that their mixture with the slices is undesirable, both from the standpoint of the finished product and from the standpoint of drying.

I claim:

1. An onion halver comprising an endless horizontally extending conveyor having horizontally disposed parallel rollers in side by side relationship forming the runs thereof, means for actuating said conveyor for movement of the upper run thereof in one direction longitudinally thereof, means for feeding a row of onions into alternate of the troughs formed by the adjacent upper sides of adjacent pairs of said rollers and in similar spaced relationship in said troughs, means providing outwardly opening annular recesses in alignment with the runs of said conveyor found in alternate rollers for positioning onions on said rollers in rows extending longitudinally of said runs with their root-stem axes parallel with the axes of said rollers and cutting means aligned with each of said rows for bisecting the onions at substantially right angles to their root-stem axes, said cutting means comprising a row of spaced cutting blades positioned at the forward end of said upper run relative to said direction of movement, means for positioning said blades in the path of movement of the onions in said troughs and a kerf in the outer sides of said rollers for receiving said blades during bisecting of the onions by said blades.

2. An onion halver comprising an endless horizontally extending conveyor having horizontally disposed parallel rollers in side by side relationship forming the runs thereof, means for actuating said conveyor for movement of the upper run thereof in one direction longitudinally thereof, means for feeding a row of onions into alternate of the troughs formed by the adjacent upper sides of adjacent pairs of said rollers and in similar spaced relationship in said troughs, means providing outwardly opening annular recesses in alignment with the runs of said conveyor found in alternate rollers for positioning onions on said rollers in rows extending longitudinally of said runs with their root-stem axes parallel with the axes of said rollers and cutting means aligned with each of said rows for bisecting the onions at substantially right angles to their root-stem axes, said cutting means comprising a row of spaced coaxial circular cutting blades positioned at the forward end of said upper run relative to said direction of movement and over said run, means for rotating said knives, means for intermittently moving said blades downwardly in paths of travel transversely of the paths of onions in said troughs during said movement of said upper run upon onions in said alternate troughs being carried below said blades.

3. In a positioner of the character described that includes an endless roller conveyer in which the rollers are adapted to support products thereon for rotation during movement of the conveyer, rotary supports at the ends of said conveyer for supporting the latter for movement about the axes of said supports, and means for rotating certain of said rollers at a uniform rate of speed during actuation of said conveyer, and means for rotating other of said rollers at a uniform rate of speed that is different from the rate of speed of said first mentioned rollers and at all times during said actuation of said conveyer.

4. In a positioner of the character described that includes an endless roller conveyer in which the rollers are adapted to support products thereon for rotation during movement of the conveyer, rotary supports at the ends of said conveyer for supporting the latter for movement about the axes of said supports, means for rotating certain of said rollers at a uniform rate of speed during actuation of said conveyer, said supports being horizontally spaced apart a substantial distance to provide said conveyer with horizontally extending upper and lower runs, said means for rotating said rollers including rotary members coaxial with each of said rollers and secured thereto for rotation and a pair of separate endless drivers respectively engageable with said members when the rollers are moving in said upper and lower runs and when said rollers are moving around said rotary supports at one of the ends of said runs.

5. In a positioner of the character described that includes an endless roller conveyer in which the rollers are adapted to support products thereon for rotation during movement of the conveyer, rotary supports at the ends of said conveyer for supporting the latter for movement about the axes of said supports, means for rotating certain of said rollers at a uniform rate of speed during actuation of said conveyer, said supports being horizontally spaced apart a substantial distance to provide said conveyer with horizontally extending upper and lower runs, said means for rotating said rollers including rotary members coaxial with each of said rollers and secured thereto for rotation and a pair of separate endless drivers respectively engageable with said members when the rollers are moving in said upper and lower runs and when said rollers are moving around said rotary supports at one of the ends of said runs, at least one of said members being in engagement with each of said drivers at all times at said one of the ends of said runs, power means for driving one of said drivers.

ROY M. MAGNUSON.

REFERENCES CITED

The following references are of record in the file of this patent:

UNITED STATES PATENTS

| Number | Name | Date |
|---|---|---|
| 1,365,129 | Thornton | Jan. 11, 1921 |
| 1,825,629 | Floyd | Sept. 29, 1931 |
| 1,875,072 | Maryott | Aug. 30, 1932 |
| 1,948,905 | Duckworth | Feb. 27, 1934 |
| 1,955,360 | Ferry | Apr. 17, 1934 |
| 2,205,059 | Clark | June 18, 1940 |
| 2,211,919 | Wool | Aug. 20, 1940 |
| 2,334,416 | Kok | Nov. 16, 1943 |